Figure 1:
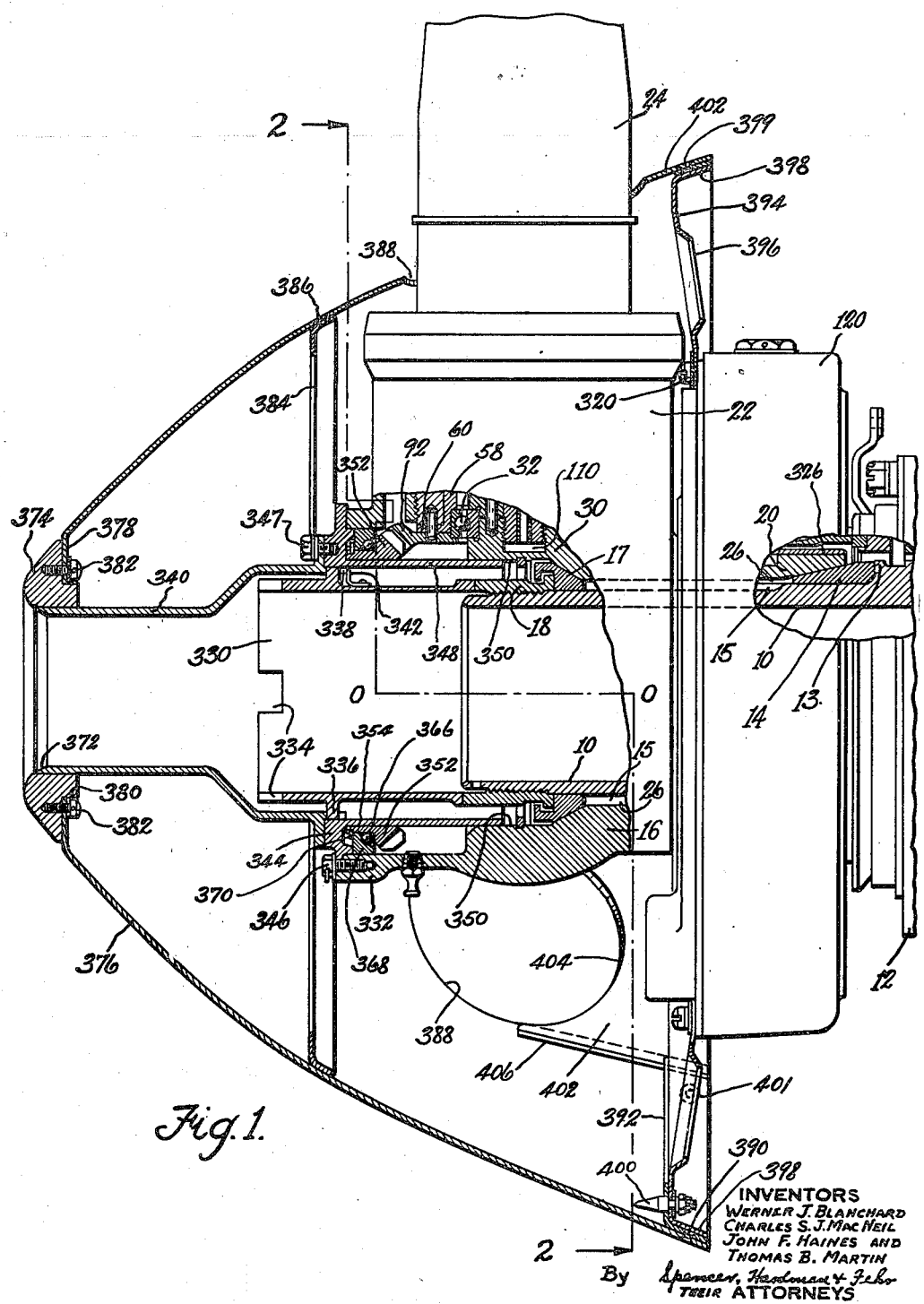

UNITED STATES PATENT OFFICE 2,405,285

CONTROLLABLE PITCH PROPELLER

Werner J. Blanchard, Charles S. J. MacNeil, John F. Haines, and Thomas B. Martin, Dayton, Ohio, assignors to General Motors Corporation, Detroit, Mich., a corporation of Delaware Application July 9, 1942, Serial No. 450,246

15 Claims. (Cl. 170—159)

This invention relates to controllable pitch propellers for aircraft.

It is an object of the invention to provide a unitary assembly of controllable pitch propeller and regulator therefor that is susceptible of mounting and dismounting as a single unit of structure with respect to a driving shaft.

Yet another object is to provide a controllable pitch propeller with a self contained regulator mechanism mounted thereon, and adapted for mounting as a unit upon a hollow shaft, with fairing or spinner means enclosing the propeller hub and regulator yet leaving the axis of the shaft open for the operation of armament.

An additional object is to adapt the rotating regulator mechanism as a support for a spinner fairing the propeller hub and blade roots.

Another object is to provide extension means for manipulation of a shaft and hub securing nut from an extended position of the hub, and lock the tightened nut in selected position.

A further object of the invention is to provide a piloted support for a spinner upon a hollow propeller shaft with means for securing the spinner firmly in position.

Further objects and advantages of the present invention will be apparent from the following description, reference being had to the accompanying drawings wherein a preferred embodiment of the present invention is clearly shown.

In the drawings:

Fig. 1 is a longitudinal sectional view of the complete unit mounted on an engine shaft of an aircraft.

Figure 2:
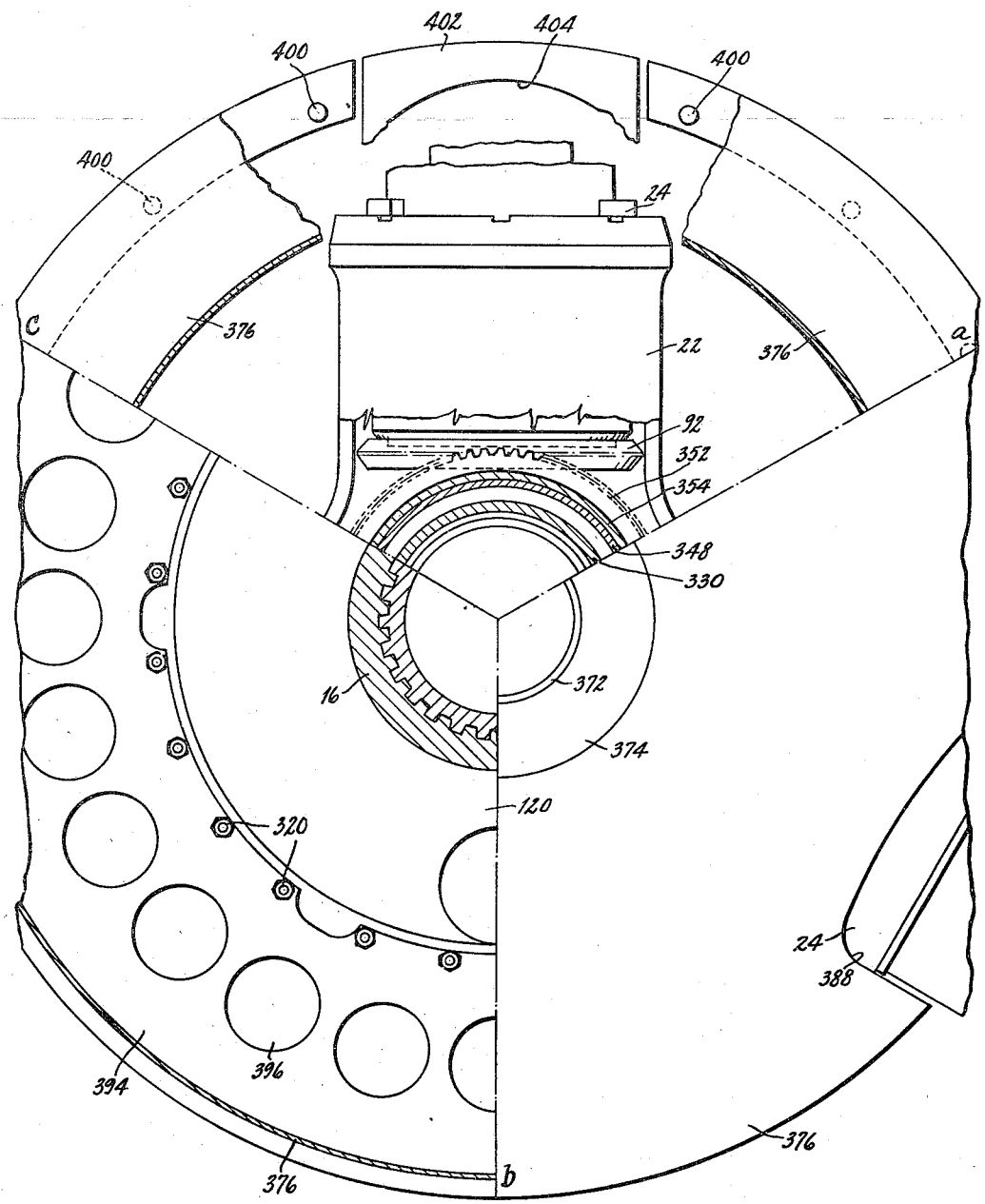

Fig. 2 is a composite view on end of the unit, with portions broken away to show portions in section, and substantially as indicated by the line and arrows 2—2 of Fig. 1, portion a—o—b of Fig. 2 being in end elevation, portion a—o—c being in section through the spinner and part of the blade socket as indicated by the line 2—o in the upper part of Fig. 1, and portion c—o—b being in section through the spinner and rear hub sleeve extension to show the regulator housing and spinner support in elevation, substantially as indicated by the line o—2 in the lower part of Fig. 1.

With particular reference to the drawings, the propeller under consideration is a hydraulically operated constant speed propeller assembled as a self-contained unit that mounts on the standard propeller shaft, and in front of the engine nose. To the extent of being a self contained unit, the structure consists of a hub, a set of shiftable blades, pitch changing mechanism or torque applying units for the blades, and automatic control mechanism therefor built into a single assembly complete and ready for installation and operation upon an available propeller shaft or the like indicated at 10. The engine nose, or gear casing as it is sometimes called, usually ends in a cover plate 12 outward from which the shaft 10 projects for mounting of a desired propeller. The shaft 10 provides a shoulder 13 against which is seated a rear cone 14 and in front of which is a splined section 15 having mating relation with a complimentarily splined hub 16 retained in position by a front cone assembly 17 and a shaft nut 18.

In the illustrated embodiment the hub 16 has a rearwardly extending sleeve portion 20 and radiating sockets 22 for reception of blades 24. The sleeve portion 20 has a central aperture providing the splines 26 for mating with the shaft splines 15 for transmitting torque from the drive shaft to the hub assembly. At the rear of the sleeve 20 a conic surface bears upon the rear cone assembly 14 and with which it is forced into contact by the front cone assembly 17. Thus, the entire hub and blade assembly is securely mounted upon the propeller shaft 10 by axial movement of the hub assembly upon the shaft, thence engagement of the threads in the nut 18 with the threads provided at the end of the shaft 10 and tightening of the nut 18.

The forward end of the sleeve 20 provides a plurality of radially extending bosses 30 each one of which is aligned and centered with respect to a socket 22, each boss supporting an antifriction bearing 32 the outer race of which is carried by or secured to blade 24. The shank of the blade 24 is of cylindrical contour and has an axial hollowed portion within which is mounted the blade shifting motors or torque applying units. The torque applying units support blade gear 92 mounted upon the flanges 60 of the cylinder 58 by means of screws or the like.

In this embodiment the shift of the blade pitch is automatic and is hydraulically controlled so as to result in the speed of the propeller being substantially constant, or closely maintained with respect to a predetermined setting of a manual control device. A self-contained hydraulic regulator unit 120 is mounted on the rearward sleeve extension of the hub by means of sleeve nut 326, and has fluid connection with the torque units in the blades, somewhat as disclosed in Blanchard et al., 2,307,101 in so far as a centrifugally responsive valve controls the flow of oil under pressure into and out of a passage 110 leading to the torque unit.

The regulator assembly with the control elements is mounted upon the propeller hub which is accomplished by slipping the regulator assembly over the rearward extension 20 of the hub and thence threading into place the regulator nut 326. The hub assembly thus constructed is ready for mounting upon the propeller shaft 10 where it seats against the inner cone 14. Application of the forward cone 17, by tightening the shaft nut 18 will secure the hub in operative relation upon the shaft 10.

For maintaining the tightness of the nut 18 and also to make it more accessible in tightening the installation there is provided a sleeve assembly 330 having lug and notch engagement with the end of the nut 18 and extending forward thereof beyond the terminal rim 332 of the hub 16 and ending in wrench notches 334. Intermediate its ends the sleeve assembly provides a flange 336 appropriately notched to receive tongues 338 on the end of a spinner adapter 340. The sleeve assembly 330 also carries L-shaped leaf springs 342 having an upturned free end adapted to engage the end of the tongues 338 when they are passed through the notches of the flange 336. Closely fitting about the flange 336 of the sleeve assembly there is a flanged sleeve 344 that is secured to the terminal rim 332 by means of a plurality of screw devices 346. The member 344 has a rearward tubular extension 348 telescoping within the bore 350 of the hub 16 so as to end beneath the hub spline bosses 30. This sleeve extension forms a bearing for a coordinating gear 352 meshing with all of the blade shifting gears 92. The coordinating gear has a sleeve portion 354 machined to form the inner race of friction reducing bearing 366 whose outer race 368 is maintained in position by spring ring 370. The member 344 when brought into position by the screws 346 acts as a thrust member for the friction reducing bearing 366. Thus by appropriately mating up the sleeve assembly 330 with the nut 18, and the notched end of the spinner adapter 340 with the notched flange 336, the apertures in the flange of the spinner adapter may be properly aligned with the threaded apertures in the member 344 for reception of the screws 347. Thus a positive lock is provided for maintaining the nut 18 in tightened relation upon the end of the shaft 10.

The forward free end of the spinner adapter 340 is chamfered off at 372 to blend in with the rounded contour of a nose ring 374. The nose ring 374 forms a forward reinforcing extremity for a thin metal shell member 376 generally conic in form and which has a forward flange 378 seating in a recess 380 of the nose ring where it is firmly secured by screw devices 382. The union of the nose ring to the spinner adapter 340 is slidable, such that the spinner adapter forms a pilot for positioning the forward end of the spinner. The spinner shell 376 increases in diameter rearwardly toward the fuselage or the nose piece of the engine and ends aft of the blades 24. To rigidify the spinner shell 376, intermediate its length a ring 384 of angular cross section is secured to the spinner shell by rivets 386 or the like. At appropriate points throughout its circumference the shell 376 is notched at 388 to pass the shanks of the blades 24, while the intervening webs are secured at the terminal ends by rivets 390 to flanged arcs 392.

The base end or rear of the shell 376 is supported by means of a plate member 394 secured at its inner periphery beneath the screws 320, or at least a part of them, holding the regulator in assembly. The plate 394 is provided with a series of apertures 396 located in a circular row between the inner and outer periphery. The outer periphery of the plate 394 is bent into a flange 398 that rigidifies the construction and provides a relatively flat surface for seating the flanged arcs 392. In a circular row between the flange 398 and the row of apertures 396 there are mounted a plurality of pilot studs 400 adapted to be received in apertures of the inner flange of the flanged arcs 392. At spaced points on the flange 398 removable inserts 402 are secured by screw devices 399, the forward ends of the inserts having a circular notch 404 to close about the rear circumference of the blade shank 24. These inserts are of greater width than is the width of the notch 388 in the member 376, and the opposite straight edges are offset at 406 so as to be received inside of and overlapping the member 376 along the extent of the notches, thus completing the spinner surface at the rear of the blades.

With the supporting plate 394 mounted in place, the spinner assembly is passed over the hub so as to straddle the blades and slide over the spinner adapter 340 with the base end of the shell 376 passing over the flange 398 of the plate, it being piloted by the elements 400 while screw devices similar to 339 secure the assembly in place as indicated at 401.

While the embodiment of the present invention as herein disclosed, constitutes a preferred form, it is to be understood that other forms might be adopted, all coming within the scope of the claims which follow.

What is claimed is as follows:

1. In a controllable pitch propeller, the combination comprising, a hub providing a plurality of sockets for rotatably supporting each a blade, an annular bulkhead, means extending radially from the hub for supporting the bulkhead, a pilot tube projecting forward of the hub, and a spinner having an open end slidably engaging about the extended end of the pilot tube and secured to the bulkhead.

2. In a controllable pitch propeller, the combination comprising, a hub providing a plurality of sockets for rotatably supporting each a blade, a hollow shaft for mounting the hub, a foraminous plate of circular contour, means securing the plate at its inner periphery to the hub, a tubular extension forward of the hub rigidly secured thereto, a spinner supported at its forward end by the extension and extending rearwardly to the foraminous plate, said forward spinner end having a slip connection with the said extension, and screw devices cooperating with the edge of the foraminous plate for securing the spinner in place.

3. The combination set forth in claim 2, wherein the forward end of the spinner provides a reinforcing ring secured thereto that slidably engages the exterior of the tubular extension.

4. The combination set forth in claim 2, wherein the forward end of the spinner is apertured in line with the hollow shaft of the propeller permitting cannon fire therethrough.

5. In a controllable pitch propeller, the combination comprising, a hub providing a plurality of sockets for rotatably supporting each a blade, means having a cylindrical wall and mounted on the hub to the rear of the propeller disc, a foraminous plate of circular contour secured at its inner periphery to the edge of the cylindrical wall, a tubular extension forward of the hub rigidly secured thereto, a spinner of conic type extending over the hub and notched to receive the blades, said spinner having piloted engagement with the tubular extension and with the foraminous plate, and means for securing the rear end of the spinner to the edge of the foraminous plate.

6. In a controllable pitch propeller, the combination comprising, a hub providing a plurality of sockets for rotatably supporting each a blade, means having a cylindrical wall and mounted on the hub to the rear of the propeller disc, a foraminous plate of circular contour secured at its inner periphery to the edge of the cylindrical wall, a tubular extension forward of the hub rigidly secured thereto, a truncated cone notched at its base to pass over the blades and engage the edge of the foraminous plate and having a reinforcing ring at the apex end faired to engage the end of the tubular extension without obstructing its bore, means for securing the base end of the cone to the foraminous plate, and removable fillers secured at spaced points on the periphery of the foraminous plate for filling the notches of the cone at the rear of the blades.

7. In a controllable pitch propeller for aircraft having a hub and a shaft for driving the same, the combination comprising, a nut for securing the hub on the shaft, a spinner fairing the hub, a forward support for the spinner extending from the hub, and means interlocking with the spinner support and nut for locking the nut against loosening.

8. In an aircraft having a hollow propeller shaft, the combination comprising, a propeller carried by the shaft and including a hub extending beyond the end of the shaft, a nut threading on the shaft and retaining the hub in driving relation therewith, a spinner for fairing the hub, tubular support means for the air piercing end of the spinner, means for securing the tubular support to the hub, and means interengaging with the tubular support and the nut for securing the nut against loosening.

9. The combination set forth in claim 8, wherein the interengaging means comprises a tubular section with lug and notch provisions interfitting with the nut and the spinner support, and wherein the axial passage through the shaft is unobstructed for gun fire.

10. In a controllable pitch propeller, the combination comprising, a conic seat on the shaft for seating an aft shoulder of the hub, interengaging driving provisions between the shaft and hub, a forward cone forcing the hub against the first mentioned conic seat, a nut for seating and withdrawing the forward cone, said nut being located substantially in the disc of propeller rotation and thereby recessed from the forward end of the hub, a thrust plate secured to the forward end of the hub and having a rearward extension disposed around the nut, a locking sleeve interfitting with the nut and extending in front of the thrust plate, a lock ring secured to the thrust plate and having nonrotatable engagement with the locking sleeve, whereby the nut is locked securely in place to preserve the hub and shaft union.

11. The combination set forth in claim 10 wherein the locking sleeve has a flange intermediate its length extending outwardly to engage the tubular extension of the thrust plate and has regularly spaced cut away portions to receive axially extending tongues of the lock ring.

12. The combination set forth in claim 10 wherein the locking sleeve has a flange intermediate its length extending outwardly to engage the tubular extension of the thrust plate and has regularly spaced cut away portions to receive axially extending tongues of the lock ring, and leaf springs secured to the sleeve and disposed opposite selected ones of the cut away portions and adapted to be engaged by the tongues of the lock ring, whereby assembly of the lock ring retains the lock sleeve in nonrattling union with the nut.

13. In a propeller hub and shaft mounting having a nut engaging a shaft and disposed in recessed relation within the hub, the combination comprising, means for manipulating and locking the nut including a tubular extension having a driving relation with, and being universally receivable by said nut, a flange circumscribing the extension and engaging within an axial bore at the forward portion of the hub, said flange being cut away in equally spaced portions so as to leave a plurality of circumferentially distributed webs, means providing for manual rotation of the tubular extension with respect to the hub whereby the nut may be loosened and tightened and means engaging the cutaway portions of the flange and adapted to be anchored at the forward end of the hub for retaining the nut in the manipulated position.

14. In a propeller hub and shaft mounting having a nut engaging a shaft and disposed in recessed relation within the hub, the combination comprising, means extending within the hub and having engagement with the nut and adapted to manipulate the nut upon the shaft, and means secured to the front end of the hub and engageable with cutaway portions of the extending means for locking the nut in a selected position.

15. In a controllable pitch propeller the combination comprising, a conic seat on the shaft for seating an aft shoulder of the hub, interengaging driving provisions between the shaft and hub, said hub being counterbored to provide a second and third step forward of the driving provisions, a forward cone between the hub and shaft located at the juncture of the first and second step of the bore, a nut engaging the shaft substantially coincident with the disc of propeller rotation extending beyond the forward end of the hub and adapted to seat and withdraw said cone, gear means for coordinating the pitch change of the propeller blades, friction reducing means supporting the gear means and engaging the third step of said hub bore, a thrust plate secured to the hub for support of the gear and bearing, and having a sleeve extending into the second step of the hub bore, said nut having a flange intermediate its length and notched to provide lips extending radially outward to engage the inside of said sleeve, and lock means selectively secured to the thrust plate, and having tongues selectively engageable with the notches of the nut extension for maintaining the nut in its seated relation on the shaft.

WERNER J. BLANCHARD.
CHARLES S. J. MacNEIL.
JOHN F. HAINES.
THOMAS B. MARTIN.